Dec. 6, 1960 G. J. MARTIN 2,962,950
COMBINATION TRUCK AND ROLLER UNIT
Filed July 8, 1957 2 Sheets-Sheet 1

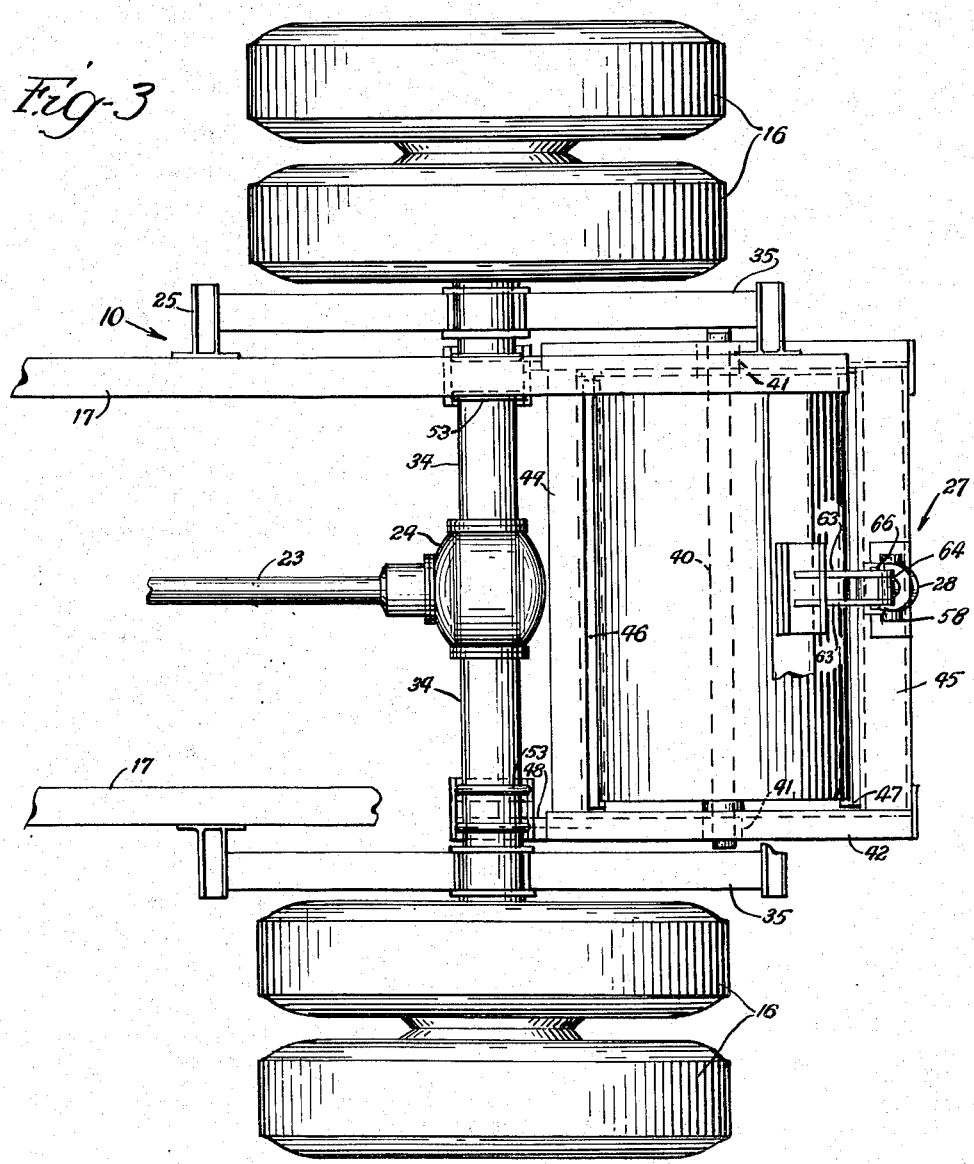

United States Patent Office 2,962,950
Patented Dec. 6, 1960

2,962,950

COMBINATION TRUCK AND ROLLER UNIT

George J. Martin, 2485 S. Williams St., Denver, Colo.

Filed July 8, 1957, Ser. No. 670,487

5 Claims. (Cl. 94—50)

The present invention relates to a new and useful roller unit for use in road maintenance and particularly adapted for mounting at the rear of a truck which has steerable front wheels which are power-driven, at least when desired.

In street and highway maintenance there is frequent requirement for a roller as, for example, in packing down a patch in the road. Light rolling or tamping down will not give a good job. While conventional road rollers do come in small sizes, still they must of necessity be relatively large and heavy in order to be effective.

The conventional rollers are one-purpose machines, have low mobility and for practical purposes must be mounted on a low bed trailer and transported from one patching place to another if the distances between them are appreciable. Accordingly, if a regular road roller is to be used in patching work it means that three pieces of highway equipment are involved, namely, a dump truck for transporting the patching materials, a low bed trailer for hauling the roller, and the roller itself. A minimum crew of two men will be required and considerable time will be spent at each patching site just in unloading and reloading the roller.

Various attempts have been made to overcome and meet the foregoing problem. For example, rollers have been provided with retractable transporting wheels with a view of making the roller units more mobile. However, the mobility of a roller cannot be appreciably increased in this manner without adding very substantially to the cost thereof. Attempts have also been made to attach rollers to trucks both at the front and rear thereof. In these proposals the attachment of a roller at the rear of a truck has been of only limited utility since a substantial portion of the weight of the truck must be left on the rear wheels in order to afford sufficient traction to propel the truck forward and backward for rolling action. Alternately, if the roller unit is mounted at the front end of a truck, as has been proposed, then in order to apply sufficient weight thereto to be effective it is necessary to lift the front wheels off the ground and the truck can no longer be steered unless a special suspension is provided for steering the roller itself.

Insofar as I am aware it has not previously been proposed to mount a detachable roller unit at the rear end of a conventional truck having power-driven front wheels. Trucks may be purchased which come equipped with front wheel drive as part of the original equipment. Such trucks are rather expensive and equivalent units may be obtained at a much lower cost by purchasing ordinary trucks and installing front wheel drive conversion kits. Such conversion units or kits have been perfected and are readily available.

Accordingly, an object of the present invention is the provision of a combination truck and roller unit wherein the steerable front wheels of the truck are power-driven, at least when desired, and the attached roller unit at the rear of the truck is normally raised but when desired is operable to lower the roller and lift the rear wheels off the ground so that full weight is on the roller, whereupon the unit is ready for use as an efficient roller.

Another object of the invention is the provision of a roller unit which may readily be installed and attached on the rear end of a conventional truck which includes a power cylinder or other equivalent device which is operable either to lower the roller to the ground and transfer the weight at the rear end of the truck to the roller by lifting the rear wheels off the ground, or, when not in use, to raise the roller from the ground and lower the rear wheels of the truck onto the ground.

Another object of the invention is the provision of such a roller unit which is compact, inexpensive, rugged and readily attached and detached from conventional dump trucks commonly in use for street and highway maintenance.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 3 is a top plan view corresponding to Fig. 2.

Figure 1:
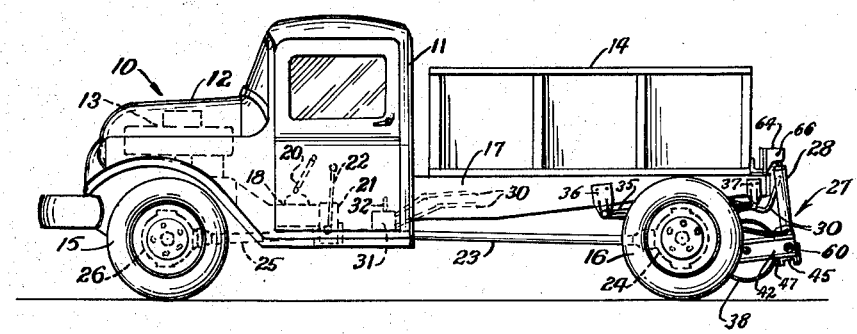
Fig. 1 is a side elevational view of a combination truck and roller unit constituting one embodiment of the invention.

Referring to Fig. 1, a dump truck is indicated generally at 10. This truck may, for example, be one of the several makes of dump trucks widely used by street and highway departments. While the details of construction of the truck 10 are not part of the present invention, for orientation it will be seen that it has a cab 11, a hood 12 which covers a motor 13, a dump box 14, a pair of front wheels 15, a pair of rear dual type wheels 16, and a pair of beams 17 which constitute main frame members.

The transmission is indicated diagrammatically at 18 with the shifting lever 20 projecting upwardly therefrom. To the rear of the transmission 18 is located a transfer case 21 with an operating lever 22. In the unit shown, the rear wheels 16 are driven in conventional manner by means of a propeller shaft 23 extending rearwardly from the transmission 18 to the rear differential which is indicated diagrammatically at 24. The front wheels 15 are also arranged to be driven when desired so that the truck may alternately be operated as a rear wheel drive truck or as a four-wheel drive truck. The front propeller shaft is indicated at 25 and extends forwardly from the transfer case to the front differential which is indicated at 26. It is well understood that in normal highway movement the front wheels 15 will not usually be driven but only the rear wheels and the truck will be operated in a conventional manner through the shifting lever 20. When it is desired to go into four-wheel drive, the lever 22 for the transfer case 21 is suitably operated so as to apply power to the front wheels as well as the rear wheels.

It will be understood that the truck 10 will also be provided with other attachments, not shown, such as a power cylinder and related gear for operating the dump box 14 from the cab 11. A compressor unit (not shown) may also be mounted on the truck so that an air hammer may be operated for use in preparing holes in the road for patching.

The roller unit, forming one embodiment of the present invention, is indicated generally at 27 at the rear end of the truck 10. As will be brought out in detail below, this roller unit 27 is operated by a hydraulic power cylinder 28, the hose connections to which are indicated at 30—30 and which run up to the cab of the truck where they are connected to a control unit indicated at 31 which is operated by a lever 32.

Figure 2:
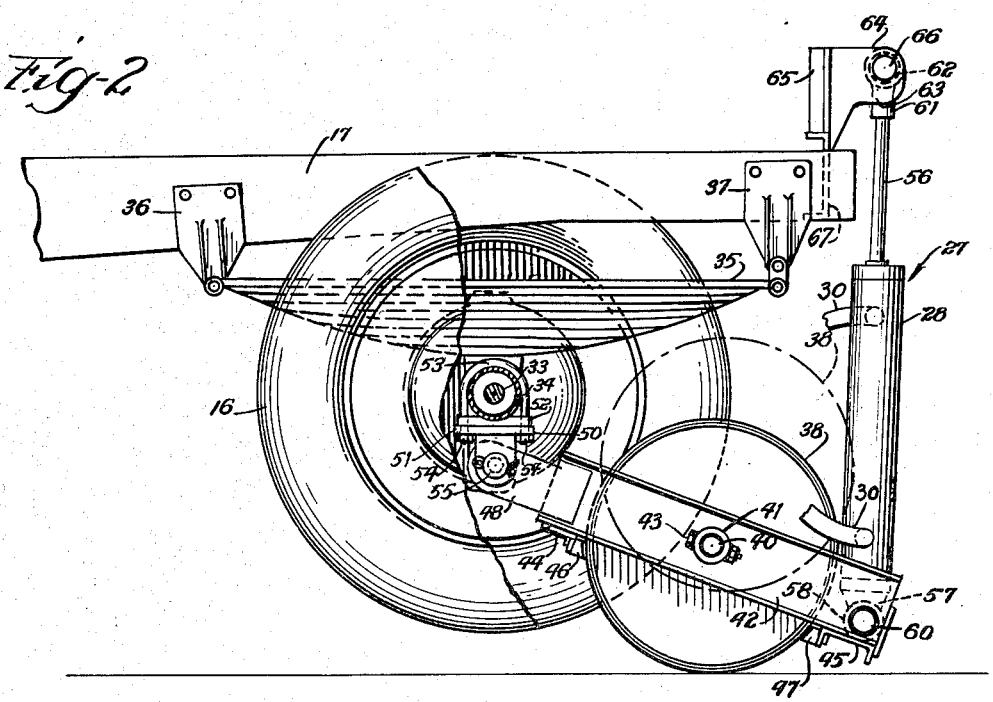
Fig. 2 is an enlarged fragmentary side elevational view showing the roller unit and the manner in which it is attached to the rear end of the truck in Fig. 1.

Reference may now be had to Figs. 2 and 3 of the drawings for a detailed description of the roller unit 27 and the manner in which it is attached and cooperable with the rear end of the truck 10. The dual wheels 16 are driven by rear axles 33 extending from opposite sides of the differential 24. The axles 33 are enclosed within rear axle housings 34 and the rear end of the truck is supported on opposite ends of the housings by means of a pair of leaf springs 35—35. The front ends of the leaf springs 35 are pivotally connected to the bottoms of mounting brackets 36—36 while the springs are swingably attached at the rear ends to rear mounting brackets 37—37. The brackets 36 and 37 are bolted to the beams 17 as shown. This is a known type of spring suspension and it will be understood that it is merely illustrative of other types of suspensions and that so-called air springs or rubber cushion suspensions may be used. It will be seen that normally the load at the rear of the truck is resiliently supported by the rear wheels 16 through the suspension springs 35.

The roller unit 27 comprises a roller 38 which is mounted for free rotation on a shaft or axle 40 which extends through and projects from opposite sides of the roller. The projecting ends of the roller axle 40 are supported in sleeves 41—41 carried approximately midway between the ends of side frame members 42—42. The side frame members 42 may be in the form of standard channels and the sleeves 41 may be welded in place therein. Bolts 43—43 extend through registering holes in the sleeves 41 and the adjacent ends of the axle 40 so as to retain the latter firmly in place.

It will be seen that the side frame members 42 are sufficiently long so that they project both to the front and rear sides of the roller 38. At their front ends the side members 42 are interconnected by an angle member 44 bolted or welded thereto. At the rear the projecting ends of the side members 42 are interconnected by means of an inverted channel member 45. The cross pieces 44 and 45 serve as support means for a pair of scraper blades 46 and 47 whereby the roller 38 is scraped clean when rotated in either direction.

It will be seen that the roller 38 is in effect mounted in a rectangular frame consisting of the side members 42 and the angle member 44 and channel member 45. At the front end of such frame each of the side members 42 is provided with a rigidly attached and forwardly projecting ear or lug 48. At the front end the ears or lugs 48 project inbetween downwardly depending pairs of ears or lugs 50 which depend downwardly from opposite ends of a bolster or pad 51 (Fig. 2) extending underneath the axle housing 34. The bolster 51 may be separated from the bottom of the axle housing 34 by means of a spacer plate 52 which has a longitudinal groove in the upper face thereof so as to receive the curvature of the axle housing. The bolster 51 may be either be permanently attached to the axle housing 34 as by welding, or it may be detachably secured thereto by shackle bolts 53—53. The lower ends of the shackle bolts project through holes provided therefor in the spacer 52 and the bolster assembly is fastened in place by means of the nuts 54—54.

It will be seen that the projecting ears 48 and the depending lugs or ears 50 are provided with registering holes for accommodating pins 55 which may be secured in place by means of cotter pins as shown. It will be apparent that the roller 38 and its surrounding frame is thus swingable in an arc at the rear of the truck 10 so that the roller may be raised off the ground or lowered onto the ground as desired.

In operation the power cylinder 28 serves controllably to raise and lower the roller 38. The cylinder 28 is of known type having a double-acting piston to which is attached a projecting piston rod or connecting rod 56. The cylinder 28 is provided at the bottom end with an apertured lug 57 adapted to fit down between a pair of upstanding ears 58 supported on the channel 45. A pin 60 passes through the spaced ears 55 and the intermediate lug 56 and is secured in place by means of cotter pins as shown. In this manner the power cylinder 28 is swingably or pivotally attached at the bottom end to the transverse frame member 45.

At the upper end, the piston rod 56 is provided with a fitting which comprises a socket 61 and an integrally formed eye 62. The socket 61 fits over the end of the piston rod 56 and is locked in place by means of a set screw 63. The eye 62 fits between a pair of apertured ears 64—64 projecting rearwardly from a cylinder mounting bracket 65. A pin 66 passes through the apertures in the ears 64 and the eye 62 and is retained in place by means of the cotter pins as shown. The bracket 65 is supported on the center of a transversely extending channel member 67 mounted on and between the rear ends of the beams 17.

It will be seen from the above description taken in conjunction with the drawings that the roller unit 27 is of simple, rugged and inexpensive construction. It is also apparent that it may be readily attached to the rear end of a conventional truck and either left thereon or removed from time to time as desired. A typical use or application of the truck-roller unit will now be described.

After the dump body 14 is loaded with patching material, e.g. cold pack, the unit is taken out onto the highway by a single man. When a spot in a highway or street is reached which requires patching, the driver stops the truck adjacent the work to be done and then proceeds to prepare the hole for patching such as by use of an air hammer operated from a compressor on the truck. When the hole is prepared, the truck is spotted so that the patching material may be either dumped or shoveled into the hole, depending upon the size thereof. When the hole is filled and ready for rolling, the operator puts the truck in four-wheel drive and operates the power cylinder 28 so as to lower the roller 38 onto the ground. The downward movement of the roller 38 is interrupted when the roller encounters the ground with sufficient force but continued application of pressure by the cylinder causes the frame for the roller to pivot clockwise as viewed in Fig. 2 around the axle 40. The combined pivoting of the roller frame and the upward thrust on the rear end of the truck frame by the power cylinder 28 combine to lift the rear truck wheels 16 off the ground as shown in Fig. 2. It will be seen that by having the turning movement of the roller frame applied underneath the axle housing, the springs 35 are not greatly distended to lift the wheels off the ground but rather the springs retain approximately their normal condition. In order to be fully effective and have the maximum weight applied to the roller 38, the rear wheels 16 are completely lifted off the ground. In lifted position the rear wheels, of course, have no traction and ordinarily the truck would not be able to move. However, since the front wheels 15 are now driven they can be used to move the truck back and forth while also serving to steer it.

When the rolling operation is complete, the cylinder 28 is operated so as to lower the rear wheels 16 onto the ground and then to completely raise the roller 38 off the ground as indicated in broken line in Fig. 2 and as shown in Fig. 1. The truck is now in readiness for rapid moving on to the next patching site.

It will be seen from the foregoing that for a very modest investment a combination truck and roller unit is provided which can be easily handled by a single man and which has both all of the mobility of the truck and all of the effectiveness of a regular roller. It should be particularly noted that the roller is journaled for free rolling movement in its frame and does not require either the application of driving torque or provision for steering. This characterizes may invention and is of major importance in realizing the desired low cost of fabrication.

While the particular roller unit shown in the accompanying drawings and described above is a highly desirable embodiment of the invention, it will be understood that certain changes and modifications may be made therein and that other embodiments may be provided without departing from the spirit and scope of this invention.

What is claimed as new is:

1. In combination with a truck having a truck frame, rear wheels having an axle, a housing for said axle, and steerable front wheels, means for driving said front wheels to propel the truck, a roller unit detachably mounted at the rear end of the truck and comprising a transversely extending ground-compacting roller, a frame journaling said roller for free rotation and having side members and at least one transverse member, means pivotally attaching said roller frame to the rear axle housing of the truck whereby said roller may be swung between raised off-the-ground position to lowered on-the-ground position, and at least one piston and cylinder power unit interconnected between a rigid part of the truck frame and said roller frame and operable alternatively to lower the roller into contact with the ground to support the rear of the truck while lifting the rear truck wheels off the ground and to raise the roller off the ground while lowering the rear truck wheels to the ground for supporting the rear of the truck, and means for supplying operative fluid pressure to said power unit.

2. The combination claimed in claim 1, in which the truck includes a chassis and spring means operatively connecting said rear wheel axle housing to the chassis, whereby the roller resiliently supports the chassis when the roller has been lowered into contact with the ground.

3. In combination with a truck having rear wheels, an axle therefor, a housing for said axle, steerable front wheels, means for driving said front wheels to propel the truck, a roller unit detachably mounted at the rear end of the truck and comprising a transversely extending ground-compacting roller, a frame journaling said roller for free rotation and having side members extending to the front and rear of said roller on opposite ends thereof and a transverse member inter-connecting the rear ends of said side members, hinge means pivotally attaching the front ends of said side members to said rear axle housing whereby said roller may be raised off the ground and lowered onto the ground, a piston and cylinder power unit the bottom end of which is pivotally supported on said transverse member and the upper end of which is pivotally attached at the rear end of the truck frame and operable alternatively to lower the roller into contact with the ground to support the rear of the truck while lifting the rear truck wheels off the ground and to raise the roller off the ground while lowering the rear truck wheels to the ground for supporting the rear of the truck, and means for supplying operative fluid pressure to said power unit.

4. The combination claimed in claim 3, in which the truck includes a chassis and spring means operatively connecting said rear wheel axle housing to the chassis, whereby the roller resiliently supports the chassis when the roller has been lowered into contact with the ground.

5. In combination with a truck having a chassis frame, rear wheels, an axle on which said rear wheels are mounted, a housing enclosing said axle, spring means operatively interposed between the axle housing and the chassis frame and resiliently mounting the axle housing, steerable front wheels, means for driving the front wheels to propel the truck, a roller unit mounted at the rear of the truck and comprising a ground-compacting roller, a roller-supporting frame including a pair of side members extending rearwardly from the chassis frame, each side member having its forward end pivoted to the axle housing, means mounting the roller on an intermediate portion of the side members, extensible and contractile mechanism connected to the rear ends of the side members and a fixed part of the truck, and means for contracting said mechanism to swing the roller-supporting frame about said pivots to raise the roller into inoperative position above the ground and for extending said mechanism to lower the roller into operative position in contact with the ground with the rear portion of the chassis frame supported by said roller, roller-supporting frame, rear axle housing and spring means.

References Cited in the file of this patent

UNITED STATES PATENTS

| | | |
|---|---|---|
| 1,375,185 | Seiter | Apr. 19, 1921 |
| 1,458,751 | Gailor | June 12, 1923 |
| 2,127,485 | Owens et al. | Aug. 16, 1938 |
| 2,132,059 | Trembly | Oct. 4, 1938 |
| 2,164,845 | Steed et al. | July 4, 1939 |
| 2,169,406 | Cost et al. | Aug. 15, 1939 |
| 2,171,255 | Keeler | Aug. 29, 1939 |
| 2,314,934 | Guernsey | Mar. 30, 1943 |
| 2,386,025 | Wills | Oct. 2, 1945 |
| 2,394,017 | Seaman | Feb. 5, 1946 |
| 2,559,427 | Hastings | July 3, 1951 |
| 2,585,117 | Gurries | Feb. 12, 1952 |
| 2,775,925 | Greiner | Jan. 1, 1957 |
| 2,874,948 | Bjorkman et al. | Feb. 24, 1959 |

FOREIGN PATENTS

| | | |
|---|---|---|
| 1,007,547 | France | Feb. 6, 1952 |
| 1,149,002 | France | July 1, 1957 |